July 7, 1936. P. F. COLLINS 2,046,367
METHOD OF PACKING HOMOGENEOUS MIXTURES OF PULVERIZED HETEROGENEOUS MATERIALS
Filed March 16, 1934 2 Sheets-Sheet 1
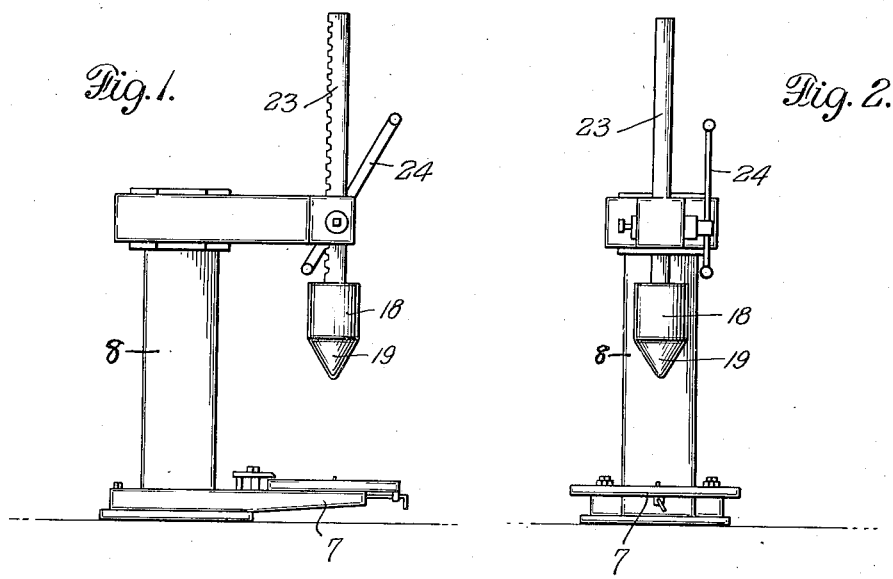
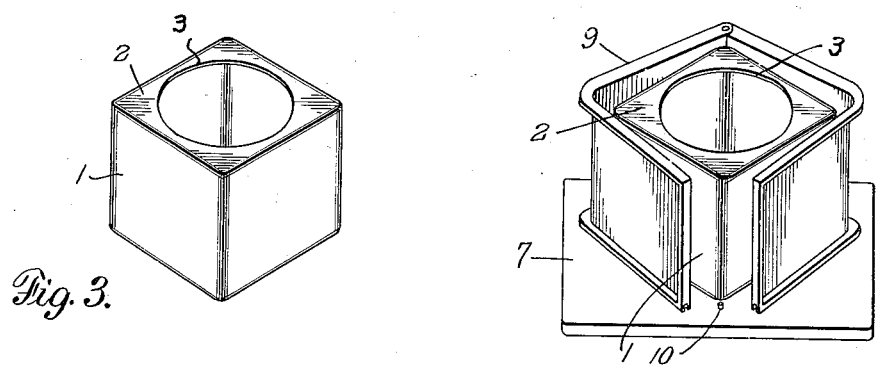
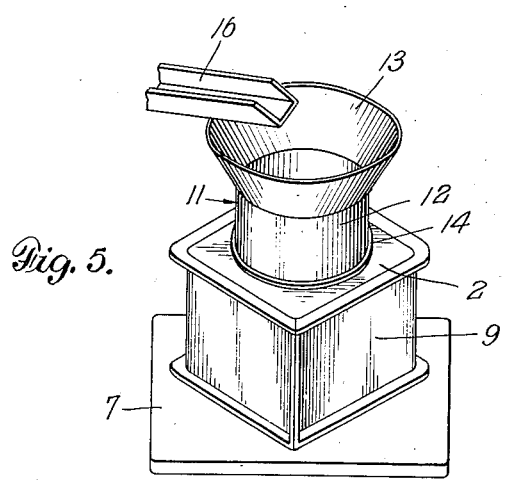
INVENTOR
Paul Francis Collins
BY
Edwin A. Clarkson
ATTORNEY July 7, 1936.                    P. F. COLLINS                    2,046,367
METHOD OF PACKING HOMOGENEOUS MIXTURES OF PULVERIZED HETEROGENEOUS MATERIALS
Filed March 16, 1934                    2 Sheets-Sheet 2

INVENTOR
Paul Francis Collins
BY Edwin S. Clarkson
ATTORNEY

Patented July 7, 1936

2,046,367

UNITED STATES PATENT OFFICE 2,046,367

METHOD OF PACKING HOMOGENEOUS MIXTURES OF PULVERIZED HETEROGENEOUS MATERIALS

Paul Francis Collins, Columbus, Ohio, assignor to The Columbus Dental Manufacturing Company, Columbus, Ohio, a corporation Application March 16, 1934, Serial No. 715,977

3 Claims. (Cl. 226—71)

This invention relates to a method of packing homogeneous mixtures of pulverized heterogeneous materials, and the main object of the invention is to provide a method of packing in containers pulverized homogeneous mixtures, composed of different materials having different specific gravities, and/or different grain sizes, and preventing the same from classifying themselves into strata as a result of agitation and shifting during storage, shipment or handling of the filled containers.

Heretofore it has been a common practice in the manufacture and packaging of such mixtures to use containers which are somewhat oversized, so that a given weight of the material packed into a container will be more or less loosely confined. When materials of this nature, so packaged, are ultimately received by the consumer, following the average amount of storage, shipment and handling, the container, due to settling of the particles of the mixture, is only about 80% filled. This settling of the contents of the container resulting from the vibration and jarring of the container tends to cause the ingredients of the mixture to separate, those having the highest specific gravity, and/or the smaller grain sizes, to settle to the bottom, whereas those ingredients which have intermediate specific gravities, and/or intermediate grain size, to classify themselves more or less in the central area of the container in strata, while the ingredients of least specific gravity, and/or largest grain size, tend to classify themselves and take a position in strata near the top of the container.

As a general rule, substantially all of these pulverized homogeneous mixtures require careful preparation by the manufacturer in regard to the selection of proper raw materials, the proper grinding and grain size of each of the ingredients, and the proper proportion or weight of each of the ingredients and their processing through machines which will insure a homogeneous mixture of the ingredients. To make certain that the materials are properly mixed and used, it is the practice of careful manufacturers to test the mixtures before packaging and to place labels on the containers setting forth the various physical properties and uses of the mixture contained therein. Such diligence and precision in mixing and packaging such mixtures are often demanded in the arts or professions using the same in order to secure absolutely the special results. Notwithstanding the utmost care and precision in compounding, mixing, blending and testing such heterogeneous materials, however, and other attempts made by the manufacturers of such products to insure the furnishing of the products in proper condition for successful specified uses, such efforts are largely nullified and rendered ineffective because of the methods heretofore employed in packaging such compositions in their containers.

It has been found that when using such packaged materials in some of the arts, the upper strata of the mixtures behave differently and have different physical properties than the middle and/or lower strata. This results in trouble and the impossibility of obtaining regular results in the function of these pulverized mixtures. In some cases, where the manufacturers are aware of the settling out and classifying of the ingredients of their mixtures into separate strata, printed instructions to prospective users are given on the container labels to shake, and effect a reblending of the ingredients thoroughly before using. It frequently happens, however, that a proper reblending cannot be carried out without the use of apparatus with which the user is unprovided, or without the use of technical knowledge in reblending which only the particular manufacturer can have, as a result of which the user of the material cannot depend upon the material giving the reliable, and often precise results, necessary for him to obtain in his work in order to satisfy his customers or clientele.

As an example of homogeneous mixtures of pulverized heterogeneous materials, attention may be called to dental investment compounds. These compounds are used by dentists and laboratory men (mechanical dentists) in the process of making precision inlays, plates, bridges, etc., for the human mouth. These compounds vary in their composition to widely different degrees, some being made for the purpose of being used in the construction of models, others for the purpose of casting inlays, bridges, etc., and still others for solder and like work in dentistry. Such investments usually contain a binder and a refractory material and lesser quantities of various modifying agents. The binders commonly used are gypsum products, such as plaster-of-Paris and alpha-gypsum, and the refractory materials commonly used are some forms of silica, such as crystalline quartz or cristobalite, with which are frequently combined such other ingredients as graphite, asbestos fiber and pumice stone. The modifying ingredients may be accelerators, such as potassium sulphate and sodium chloride, or retarders, such as glue and dextrin for respectively hastening or retarding the setting of the gypsum binder; also materials which aid thermal expansion of the investment mix, such as boric acid, and such other ingredients as may be used to identify a particular manufacturer's product, such as organic dyes. The grain sizes of these various ingredients and proportions of the ingredients vary, depending upon the particular purpose, intent and function of the dental investments, whether for casting, soldering or model work.

As an illustration in the use of casting investments in dentistry, the following procedure is resorted to: The dentist prepares a cavity in a natural tooth for a gold inlay. Wax is then pressed into the cavity and the outer surfaces modeled and contoured in precise detail. The wax pattern is removed, impaled upon a sprue pin and through common procedure in the art is surrounded with a wet investment mix. By the time the investment mix has completely set up and hardened, expansion (setting expansion) has taken place. The sprue pin is removed and the investment subjected to an elevated temperature sufficient to dissipate the wax pattern and expand (thermal expansion) the investment. This leaves an expanded wax pattern cavity in the interior of the investment into which molten casting gold is forced through the hole left by the sprue pin.

In general, dental gold alloys for casting undergo about 1.25 percent shrinkage while cooling from their molten state to their solid state. In an attempt to compensate for this shrinkage of the gold alloy, all investment manufacturers have made an effort to produce products wherein their setting expansion plus their thermal expansion, hence their total expansion, would equal the gold shrinkage. To further gain these ends, the manufacturer usually recommends certain preferred percentages of water which shall be added to the pulverized investment mixture, a preferred length of time for the mix to set-up (setting expansion), and certain preferred elevated temperatures for thermal expansion. These preferred recommendations are necessary because the present known ingredient materials that go to make up the investment mixtures possess rather fixed physical properties, and the ingredients must be blended homogeneously within comparatively narrow ranges to preserve the several requirements of the art, resulting in the aggregate mixture being more or less inflexible. In cases where these mixtures have classified themselves into strata setting expansion varies decidedly, also thermal expansion, and moreover, the sum total of both setting and thermal expansion react irregularly. Further, such classified mixtures present marked variations in the hardness and refractoriness of the investment. In such instances, for example, one portion of the container between top and bottom presents a mixture high in the percentage of quartz; in another portion the mixture is high in the percentage of gypsum. Where the quartz percentage is high the setting expansion is decreased; the thermal expansion is increased; the total expansion is increased and the strength and hardness impaired. Where the gypsum percentage is high, the setting expansion is increased; the thermal expansion is decreased; the total expansion is decreased; and the refractoriness impaired.

Investment mixtures packaged for soldering and model work have also reacted irregularly, because of the tendency of the ingredients to separate from a homogeneous mixture.

The non-homogeneity of the dental investment mixtures has been costly to the dentist, to the mechanical dentist and to the patient. It has been costly to the dentist in the prevalence of ill-fitting restorations which had to be made over, resulting in loss of labor, time, materials and in some instances, his clientele. To the mechanical dentist it has meant the loss of labor, time, materials and often the good-will of the dentist. To the patient it has meant the loss of time in requiring his presence for make-over work, also the patient frequently received and paid for poorly fitted restorations in as much as the dentist could not produce more accurate structures because of the irregular behavior of the dental investments.

In packing homogeneous mixtures of pulverized heterogeneous materials by my method I overcome all of these disadvantages. In carrying out my process, generally, I prepare a homogeneous mixture and pack it under pressure in containers. The amount of pressure and the number of the steps of filling and pressing in individual containers are dependent chiefly on the shape of the pulverized grains, the fineness of the grain size, the specific gravity of the ingredients, and the shape and size of the containers.

Where the shape of the individual grain is somewhat angular with the corners and edges tending to be sharp, a moderate amount of pressure is employed. Under such conditions, small wide mouth containers and small open end drums can usually be packed with one filling and one pressing, whereas large containers, large drums and odd shaped containers may require two steps; for example, 60 to 90 percent of the mixture is placed in the container, then pressed, next add the remaining portion of the mixture, then press and seal.

Where the shape of the individual grain is somewhat boulder-like with corners and edges tending to be smooth and rounded greater pressure is employed and usually a greater number of steps of filling and pressing are required for each individual container. Generally stated, the amount of pressure and the number of the steps of filling and pressing are largely influenced by the differential of specific gravity of the ingredients and also by the size of the grains (degree of pulverization), and the shape of the different grains.

In carrying out my method in dental investment mixtures, for example, where the largest percent of the grains of the ingredients are somewhat angular, where the specific gravities of the ingredients are within moderate differentials and where at least 85 percent of the grains will pass through 200 mesh screens I employ pressure from about 1 to 10 pounds per square inch for containers with capacities of from 1 to 25 pounds. I prefer to employ two steps in packing in this instance.

Where large containers, such as drums ranging upward of 25 pounds content, are used in association with dental investments, good results can be obtained by using the same relative pressure, as in the instance of small containers. In association with such pressure one step, by my method, produces good results although, generally, I prefer three steps.

With my method of packing under pressure, I firmly support each grain with a generally equalized pressure from other surrounding grains. The containers are so selected as to size and the lids so seated as to substantially hold the equalized support of the grains. By my method, homogeneity of the dental mixture is maintained and the uniformity of the contents of the container is substantially constant from top to bottom irrespective of the storage, shipping and handling commonly practiced.

In the accompanying drawings I have shown certain means for carrying my method into practical effect, without, however, restricting the invention to the particular means which, for example, I have set forth. In these drawings:—

Fig. 1 is a side elevation of a form of packing press which may be used in carrying out the process.

Fig. 2 is a front elevation of the same.

Fig. 3 is a perspective view of a type of container which may be employed.

Fig. 4 is a perspective view of the bed or platform of the press and a container or workholder mounted thereon, the workholder being shown in open position.

Fig. 5 is a view similar to Fig. 4 showing a first filling step.

Figure 6:
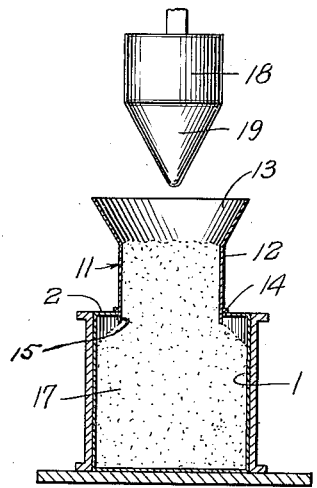
Fig. 6 is a sectional view through the container as it appears after the first filling step and with the press plunger in position for a first pressing action.

The container 1 may be of any suitable form and size for holding the material in quantities of from 1 to 25 pounds or more and, as shown in the present instance, is of that type comprising a rectangular body portion having a top wall 2 provided with a mouth or opening 3 of less diameter than the diameter of the container, which container is adapted to be closed by a cover or seal 4 having a depressed center or funnel portion 5 adapted to fill the opening 3 and extend downwardly a slight distance into the container and having a flange portion 6 which overlaps the wall 2 in the closed condition of said seal or cover. In packing the container 1 according to my improved method, the container is preferably placed upon the bed or platform 7 of a suitable press 8, the platform 7 of which is provided with a clamp or workholder 9 having hinged jaws or members movable to closed position to clamp the container and to open position to release it and adapted to be held in closed position by any suitable type of latch or fastening means 10.

In the operation of filling the container 1, the container is clamped firmly in position by the holder 9 and a filling funnel 11 is then applied thereto, as shown in Fig. 5. This funnel is provided with a lower cylindrical portion 12 and an upper conical portion 13, said portion 12 being provided a short distance above its lower edge with a supporting flange 14 to rest upon the container top 2 and support the funnel in position, leaving the said lower edge of the portion 12 projecting in the form of a retaining projection 15 which fits within the opening 3 and centers the funnel therein. Through this funnel the mixture is introduced into the container from a suitable source of supply through a chute or other conductor 16. The amount of the material 17 thus introduced on the first filling action into the container is less than that to be packed therein, but constitutes a major proportion of the amount to be packed, and, owing to its loose condition, this material loosely fills all of the container except a space beneath the top wall 2 surrounding the opening 3 and extends upwardly above the top of the container to a certain elevation within the funnel 11.

Figure 7:
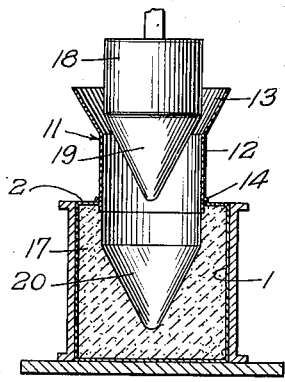
Fig. 7 is a view similar to Fig. 6 showing the condition of the material in the container after the first pressing action.

The material 17 so supplied to the container 1 is then subjected to initial compression by means of a compressing plunger 18 having a conical lower end or compressing portion 19. This plunger is forced downward through the funnel 15 and to a sufficient depth into the container to displace that portion of the material which is within the funnel and force it downwardly into the container and compress or condense the material in the container to the desired degree of pressure or density. In this action the conical portion 19 of the plunger acts to displace and exert pressure in all directions radially toward the side walls of the container as well as to exert downward and upward pressure, such upward pressure causing the material to fill the void or space previously existing at the top of the container beneath the wall 2 and around the opening 3. This first pressing operation being completed, the plunger 18 is withdrawn from the container, as shown in Fig. 7, with the result that there is left within the container the initial charge or amount of material in compressed condition and having formed therein a cavity 20 which is of conical shape at its lower portion and cylindrical shape at its upper portion conforming to the contour of the portion 19 and lower part of the cylindrical body portion of the plunger 18. This operation obviously effects the filling of the upper portion of the container beneath the wall 2 by radial and upward displacement of portions of the initial charge of the material.

Figure 8:
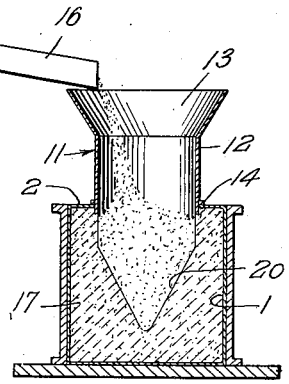
Figs. 8, 9 and 10 are views similar to Figs. 6 and 7, showing, respectively, a second or final filling operation, and second and third pressing operations.
Figure 9:
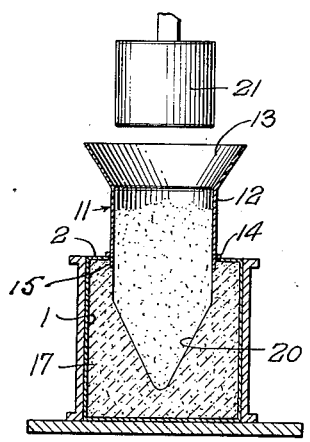
Figure 10:
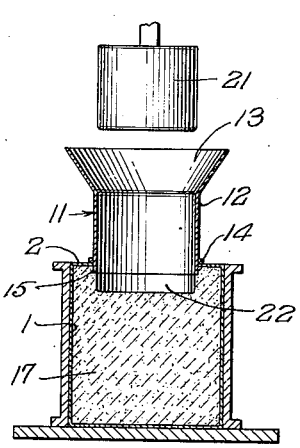
Figure 11:
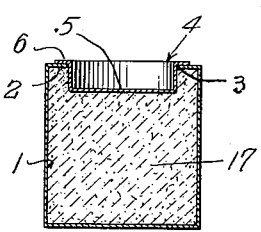
Fig. 11 is a sectional view through the packed and sealed container.

Upon withdrawal of the plunger 18 at the close of this first pressing operation, the remainder of the material to complete the charge is then supplied through the conductor 16, as shown in Fig. 8, to fill the cavity 20 and this material in its loose or unpacked condition extends to a certain level upwardly in the funnel 11, as shown in Fig. 9. A plunger 21 of cylindrical form to snugly fit the cylindrical part of the funnel is then substituted for the plunger 18 and, through the action of the press, is forced downwardly through the funnel and to a slight degree below the container wall 2 to displace the second charge of the material and pack it in the container so that the material filling the cavity 20 will be packed under the same degree of pressure as the original charge, and at the close of this operation the plunger 21 and the funnel 11 are removed. The container is then in condition to be sealed or to have its cover 4 applied, and in such condition the container is filled with the material at all points except immediately below and in line with the opening 3 where the material terminates just below the opening to provide a recess 22 to receive the depressed portion of the lid or cover 4. This lid or cover 4 is then applied to seal the opening 3 and its portion 5 extends downwardly into and closes the recess 22 and the force with which this cover is fitted in position results in the continued application to the packed material through the cover of pressure conforming to that under which it was packed or sufficient to maintain the packed material in its compressed condition against movement or shifting in any direction to cause separation of its different components according to their different specific gravities. Each plunger 18 and 21 is carried by a rack bar 23 slidably mounted on the press 8 and movable by suitable gearing actuated by an operating handle 24 whereby the plunger may be raised and lowered and in its pressing action caused to exert an exact degree of pressure on the material, and the plunger of each type is detachably mounted so that the other type of plunger may be substituted quickly and conveniently for use in its place.

The result of the operation of packing the material in the container 1 in the manner above described is to provide a packed container holding a definite amount of material in which the material is packed under such pressure that it can not possibly shift as a result of movements or agitation due to storing, shipping or handling, so that when the container is opened for use the compound will be available for use in exact condition of mixture in which its components were combined for use by the manufacturer to meet the most highly technical conditions required to secure desired results. Hence by my method compositions or mixtures of materials of different specific gravities may be combined in the exact manner necessary for certain definite uses and functions and handled, shipped and stored without change of position of its different ingredients, so that the manufacturer and user may be assured that a mixture designed to have certain working properties may be employed by the user to secure functions conferred by such properties so that invariable results may always be obtained by the use of definite mixtures.

As stated, the steps of the method as above described are preferably employed, but that the amount of pressure used, the number of pressure steps employed, and the amounts of the material supplied to the container for successive pressure steps may be varied according to the character of the compositions to be packed, the form and size of the containers used, and other controlling factors.

What I claim is:—

1. The method of packing in containers dental investment compounds in the form of granular aggregates of different materials which differ in grain size, shape or specific gravity and which are so mixed as to insure specific and uniform reactions of all parts of the compound in said container under the various conditions to which such compositions are subjected in the use thereof, and whereby stratification separation of the components of the packed mixture under disturbing forces is prevented, which comprises compounding a mixture having predetermined physical properties for a specified use, introducing the compound into the container in the properly mixed state, forcing a plunger with a straight-line movement into said container to compact the compound to a degree that will substantially prevent migration of the grain and stratification separation of the components of the compound from their initial properly mixed state under disturbing forces, and then applying a closure to such container so that it exerts sufficient pressure upon the packed compound to maintain it substantially in its initial compacted state.

2. The method of packing in containers dental investment compounds in the form of granular aggregates of different materials which differ in grain size, shape or specific gravity and which are so mixed as to insure specific and uniform reaction of all parts of the compound in said container under the various conditions to which such compounds are subjected in the use thereof, and whereby stratification separation of the components of the packed mixture under disturbing forces is prevented, which comprises compounding a mixture having predetermined physical properties for a specified use, introducing the compound into a container having a flange forming a part of the top wall with an aperture therein for the receipt of a friction top, introducing the compound into the container in the properly mixed state, forcing the conical end of a plunger into the compound with a straight-line movement so as to compact such compound against the bottom and side walls and against the undersurface of said flange to a degree that will substantially prevent migration of the grains and stratification separation of the components of the compound from their initial properly mixed state under disturbing forces, introducing additional material in a properly mixed state into said conical cavity and thereabove in sufficient quantity that it will substantially fill said cavity when compacted, and forcing the cylindrical end of a plunger aganist said newly-introduced material with a straight-line movement to similarly compact it, and then applying the friction top to such container so that it exerts sufficient pressure upon such packed material to maintain it substantially in its initial compacted state.

3. The method of packing in containers dental investment compounds in the form of granular aggregates of different materials which differ in grain size, shape or specific gravity and which are so mixed as to insure specific and uniform reaction of all parts of the compound in said container under the various conditions to which such compounds are subjected in the use thereof, and whereby stratification separation of the components of the packed mixture under disturbing forces is prevented, which comprises introducing the compound into a container having a flange forming a part of the top wall with an aperture therein for the receipt of a friction top, introducing the compound into the container in a properly mixed state, forcing the conical end of a plunger into the compound with a straight-line movement so as to compact such compound against the bottom and side walls and against the undersurface of said flange to a degree that will substantially prevent migration of the grains and stratification separation of the components of the compound from their initial properly mixed state under disturbing forces, and forcing the cylindrical end of a plunger against said material with a straight-line movement to finally compact it, and then applying the friction top to such container so that it exerts sufficient pressure upon such packed material to maintain it substantially in its initial compacted state.

PAUL FRANCIS COLLINS.